US012614325B2

(12) United States Patent
Pham et al.

(10) Patent No.: US 12,614,325 B2
(45) Date of Patent: Apr. 28, 2026

(54) SYSTEMS AND METHODS FOR ARRANGING DESIGN ELEMENTS

(71) Applicant: Canva Pty Ltd, Surry Hills (AU)

(72) Inventors: Sidney Elton Pham, Sydney (AU); Annaliese Catherine Rozvany, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 31 days.

(21) Appl. No.: 18/904,359

(22) Filed: Oct. 2, 2024

(65) Prior Publication Data

US 2025/0117999 A1 Apr. 10, 2025

(30) Foreign Application Priority Data

Oct. 6, 2023 (AU) ................................. 2023241367

(51) Int. Cl.
*G06T 11/60* (2006.01)
(52) U.S. Cl.
CPC .......... *G06T 11/60* (2013.01); *G06T 2200/24* (2013.01)
(58) Field of Classification Search
CPC ... G06T 11/60; G06T 2200/24; G06Q 10/043; G06F 30/12
See application file for complete search history.

(56) References Cited

U.S. PATENT DOCUMENTS

| 8,634,674 | B2 * | 1/2014 | Hanechak | ............... G06T 11/60 |
| | | | | 715/251 |
| 10,600,223 | B2 * | 3/2020 | Martin | ...................... G06F 8/38 |

| 10,916,067 | B1 * | 2/2021 | Gehlaut | ............ G06F 18/23213 |
| 11,514,203 | B2 * | 11/2022 | Bowen | ................... G06F 3/0482 |
| 12,299,791 | B2 * | 5/2025 | Naseby | ................. G06F 3/0482 |
| 12,379,835 | B2 * | 8/2025 | Kimhi | ............... G06Q 10/0633 |
| 2013/0042172 | A1 * | 2/2013 | Mansfield | ............. G06F 40/126 |
| | | | | 715/234 |
| 2013/0093787 | A1 * | 4/2013 | Fulks | ...................... G06T 11/60 |
| | | | | 345/629 |
| 2014/0208191 | A1 | 7/2014 | Zaric et al. | |

(Continued)

FOREIGN PATENT DOCUMENTS

CN 111462282 A * 7/2020 ............. G06N 3/044

OTHER PUBLICATIONS

Debi Dalio, Clown Fish Cafe: Alignment and Distribution of Graphic Elements in Inkscape, Mar. 4, 2014 (Mar. 4, 2014), XP093244690, https://clownfishcafe.blogspot.com/2014/03/align-and-distribute-in-inkscape.html, pp. 1-7.

(Continued)

*Primary Examiner* — Laurie A Ries
(74) *Attorney, Agent, or Firm* — GrowIP Law Group LLC

(57) ABSTRACT

Computer processing systems and computer implemented methods for determining an arrangement of elements of a design are described. The arrangement may be into rows or columns. Collections of elements for rows and/or columns are determined based on overlap of the elements along a dimension prior to arrangement. Each collection may be arranged within an area of the design into a row or column. In some embodiments an initial arrangement into both rows and columns is determined and a final arrangement is determined based on which arrangement results in a least total overlap area of the elements.

15 Claims, 12 Drawing Sheets

(56)        References Cited

U.S. PATENT DOCUMENTS

| | | | |
|---|---|---|---|
| 2016/0147715 A1 | 5/2016 | Ellis et al. | |
| 2017/0061030 A1* | 3/2017 | Fu | G06F 16/278 |
| 2018/0210864 A1* | 7/2018 | Zhang | G06F 40/30 |
| 2019/0087392 A1* | 3/2019 | Ben-Aharon | G06F 40/151 |
| 2020/0154095 A1* | 5/2020 | Fleischman | G06V 20/20 |
| 2020/0311184 A1 | 10/2020 | Asente | |
| 2021/0191578 A1* | 6/2021 | Miura | G06F 3/04886 |
| 2022/0358261 A1* | 11/2022 | Weidmann | G06F 30/13 |
| 2023/0185976 A1* | 6/2023 | Kerr | G06F 30/12 |
| | | | 703/1 |
| 2023/0410401 A1* | 12/2023 | Mudra | G06T 13/80 |
| 2024/0370643 A1* | 11/2024 | Gu | G06F 40/18 |
| 2025/0103771 A1* | 3/2025 | Radford | G06T 11/60 |

OTHER PUBLICATIONS

Photoadvanced: "Rows and Columns—Inkscape Beginners' Guide ep29", Mar. 15, 2023 (Mar. 15, 2023), XP093244696, https://www.youtube.com/watch?v=NUfQSaJurOE (last visited Jan. 29, 2025), pp. 1-2.

Examination Report No. 1 for Australian Application No. 2023241367 mailed Nov. 15, 2023, pp. 1-7.

Examination Report No. 2 for Australian Application No. 2023241367 mailed Nov. 8, 2024, pp. 1-4.

* cited by examiner

300

400

402 ⟶ Receive element list

404 ⟶ Determine collections of elements

406 ⟶ Arrange each collection in a selection box

408 ⟶ Determine arrangement direction

410 ⟶ Apply or finalise arrangement of elements

700

702 — Receive collections and a selection box

704 — Determine a global gap size

706 — Select a collection

708 — Space elements with the global gap size

710 — Align elements along sort direction

712 — Align collection to start of selection box

714 — Are there collections remaining?

Yes

No

716 — Space collections evenly across the selection box

SYSTEMS AND METHODS FOR ARRANGING DESIGN ELEMENTS

TECHNICAL FIELD

The present disclosure is directed to systems and methods for arranging design elements. The systems and methods may have particular application in design creation and editing computer applications.

BACKGROUND

Various computer applications for creating, editing designs exist. Generally speaking, such applications allow users to create a design by, for example, creating a page and adding design elements to that page and to edit the design into a final form, for example for publication.

Such applications may provide users with the ability to create a new design or edit an existing design by selecting or creating design elements and adding them to a design page. Various types of design elements may be used, including visual elements such as graphics, photographs (or other images), text elements, video elements, and/or other elements. Once an element has been added to a page, an application will generally provide a user with tools that allows the user to reposition the element on the page and/or resize the element.

In many cases a user will want elements to be neatly arranged or positioned. However, doing so can in some cases present challenges and be time consuming, especially when there is a multitude of elements in a confined space. Whilst existing computer applications provide some functionality to assist in this task, such as a function to align elements, there remains a need for further or alternative functions for arranging design elements.

SUMMARY

Described herein is a computer implemented method for arranging a plurality of elements of a design along an arrangement direction, the method including:

allocating, by a computer processing system, the plurality of elements to a plurality of collections, wherein a first collection in the plurality of collections includes a plurality of elements that overlap along a dimension perpendicular to the arrangement direction, a second collection in the plurality of collections includes a plurality of elements that overlap along a dimension perpendicular to the arrangement direction, and the elements in the first collection are different to the elements in the second collection; and arranging, by the computer processing system, the plurality of elements based on the allocated collections, including one or more of distributing each element in the first collection design along the arrangement direction, distributing each element in the second collection along the arrangement direction, aligning elements, and positioning within the design the elements of the first collection as a group and the elements of the second collection as a group.

In some embodiments allocating the plurality of elements to the first collections includes processes of: sorting the plurality of elements into a sorted order, wherein the sorting is according to a sort direction perpendicular to the arrangement direction and allocating the foremost element in the sorted order to the first collection; and considering one or more subsequent elements of the plurality of elements in the sorted order, determining that a currently considered element overlaps in the dimension perpendicular to the arrangement direction with all the plurality of elements currently in the first collection, and in response allocating the currently considered element to the first collection.

In some embodiments allocating the plurality of elements to the second collection includes a process of considering a further element of the plurality of elements in the sorted order, determining that the further element does not overlap in the dimension perpendicular to the arrangement direction with all the plurality of elements currently in the first collection and in response allocating the further element to the second collection. Allocating the plurality of elements to the first collection may include a process of determining that each element allocated to the first collection does not overlap in the dimension perpendicular to the arrangement direction more with the further element than with the foremost element in the sorted order. Allocating the plurality of elements to the second collection may include a process of determining that a said currently considered element initially allocated to the first collection overlaps more in the dimension perpendicular to the arrangement direction with the further element than with the foremost element in the sorted order and in response reallocating that considered element from the first collection to the second collection. Allocating the plurality of elements to the second collection may include a process of, after the reallocating, considering one or more further subsequent elements of the plurality of elements in the sorted order, determining that a currently considered element overlaps in the dimension perpendicular to the arrangement direction with all the plurality of elements currently in the second collection, and in response allocating the currently considered element to the second collection.

In some embodiments the method further includes for each of the plurality of collections, determining a spacing of the elements in that collection which evenly spaces the elements fully across an area of the design along the arrangement direction, and determining a smallest spacing of said evenly spaced elements; wherein the distributing each element in the first collection and second collections includes spacing elements in the first and second collections by the determined smallest spacing. Positioning within the design, the elements of the first collection as a group and the elements of the second collection as a group may include distributing the elements of the first collection and the elements of the second collection across the area, along a direction perpendicular to the arrangement direction. The area may be a user selected area and the method may further include receiving a user selection of the plurality of elements, wherein the user selection of the plurality of elements is determined as all elements of the design within the user selected area.

In some embodiments the arranging includes all of distributing each element in the first collection design along the arrangement direction, distributing each element in the second collection along the arrangement direction, aligning elements, and positioning within the design the elements of the first collection as a group and the elements of the second collection as a group.

Also described herein is a computer implemented method for determining an arrangement of a plurality of elements of a design into rows or columns, the method including:

allocating, by a computer processing system, the plurality of elements to:
    a first plurality of collections, wherein in each of the first plurality of collections the elements at least partially overlap in a vertical dimension; and
    a second plurality of collections, wherein in each of the second plurality of collections the elements at least partially overlap in a horizontal dimension;
determining, by the computer processing system, an initial arrangement of the first plurality of collections into rows within an area of the design and an initial arrangement of the second plurality of collections into columns within the area of the design;
and either:
determining, by the computer processing system, that the initial arrangement into rows results in less superimposition of the plurality of elements than the initial arrangement into columns and in response determining the arrangement of the plurality of elements as an arrangement into rows, or
determining, by the computer processing system, that the initial arrangement into columns results in less superimposition of the plurality of elements than the initial arrangement into rows and in response determining the arrangement of the plurality of elements as an arrangement into columns.

In some embodiments the area of the design is a user specified area.

In some embodiments the plurality of elements were determined by the computer processing system as the elements of the design within the user specified area.

Also described herein is a computer implemented method for determining an arrangement of elements of a design into rows or columns, the method including:
    receiving a user selection of an area within the design, the area including within it a plurality of elements of the design;
    allocating, by a computer processing system, the plurality of elements to:
        a first plurality of collections, wherein in each of the first plurality of collections the elements at least partially overlap in a vertical dimension; and
        a second plurality of collections, wherein in each of the second plurality of collections the elements at least partially overlap in a horizontal dimension;
    determining, by the computer processing system, an initial arrangement of the first plurality of collections into rows within the area of the design and an initial arrangement of the second plurality of collections into columns within the area of the design; and
    determining, by the computer processing system, an arrangement of the plurality of elements as either the initial arrangement of the first plurality of collections into rows within the area of the design or the initial arrangement of the second plurality of collections into columns within the area of the design.

In some embodiments the method further includes before the determining of the arrange of elements: causing the display on a computer display indicia representing both the initial arrangement of the first plurality of collections into rows and the initial arrangement of the second plurality of collections into columns; and receiving a user selection of the initial arrangement of the first plurality of collections into rows; wherein the arrangement of the plurality of elements is determined as the initial arrangement of the first plurality of collections into rows responsive to the user selection of the initial arrangement of the first plurality of collections into rows.

In some embodiments determining the arrangement of the plurality of elements includes determining that the initial arrangement of the first plurality of collections into rows results in less superimposition of elements than the initial arrangement of the second plurality of collections into columns and in response determining the arrangement of the plurality of elements as an arrangement into rows.

The plurality of elements referred to in this specification may be a graphic, image, text, or video.

Also described herein is a computer processing system including a processing unit and a non-transient computer-readable storage medium storing instructions, which when executed by the processing unit, cause the processing unit to perform a method as described herein.

Also described herein is non-transient storage medium storing instructions executable by processing unit to cause the processing unit to perform a method according as described herein.

DETAILED DESCRIPTION

Figure 1:
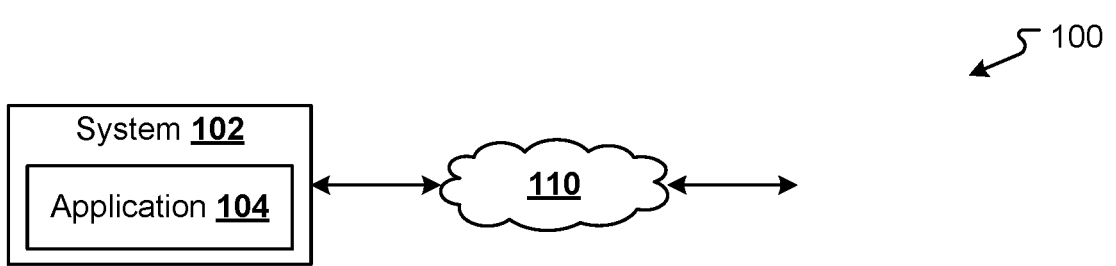
FIG. 1 is a diagram depicting a networked environment in which various features of the present disclosure may be implemented.

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

The present disclosure relates to computer implemented techniques for arranging a set of design elements. The techniques may be viewed as automatic, in the sense that a user of the computer need not or does not specify the locations of the design elements. In other words the computer determines an arrangement, or determines a proposed arrangement that may be accepted or rejected or accepted with a modification by the user. The user may request an arrangement or proposed arrangement, for example by operating a user interface of the computer.

The techniques disclosed herein are described in the context of a design platform that is configured to facilitate various operations concerned with digital designs. In the context of the present disclosure, these operations relevantly include processing to arrange sets of design elements.

A design platform may take various forms. In the embodiments described herein, the design platform is described as a stand-alone platform, for example a single application or set of applications that run on a computer processing system and perform the techniques described herein, without requiring server-side operations.

The techniques described herein can, however, be performed or be adapted to be performed in alternative scenarios. For example, the techniques described herein may be performed in a client-server type design platform, for example one or more client applications and one or more server applications that interoperate to perform the described techniques.

FIG. 1 depicts a computer processing system 102 that may be configured to perform the various functions described herein. Computer processing system 102 may be any suitable type of computer processing system, for example a desktop computer, a laptop computer, a tablet device, a smart phone device, or an alternative computer processing system.

In this example, system 102 is configured to perform the functions described herein by execution of a software application 104—that is, computer readable instructions that are stored in a storage device, such as non-transient memory 210 described below, and executed by a processing unit of the system 102, such as processing unit 202 described below.

In the present example, application 104 (and/or other applications of system 102) facilitate various functions related to digital designs. These may include, for example, design creation, editing, storage, organisation, searching, storage, retrieval, viewing, sharing, publishing, and/or other functions related to digital designs.

In the example of FIG. 1, system 102 is connected to a communications network 110. Via network 110 system 102 can communicate with (e.g. send data to and receive data from) other computer processing systems (not shown). For example a design with elements to be arranged and/or one or more elements for inclusion in a design may be received by system 102 via the network 110. The techniques described herein can, however, be implemented on a stand-alone computer system that does not require network connectivity or communication with other systems.

In FIG. 1, system 102 is depicted as having/executing a single application 104. However, system 102 may (and typically will) include additional applications (not shown). For example, and assuming application 104 is not part of an operating system application, system 102 will include a separate operating system application or group of applications.

Figure 2:
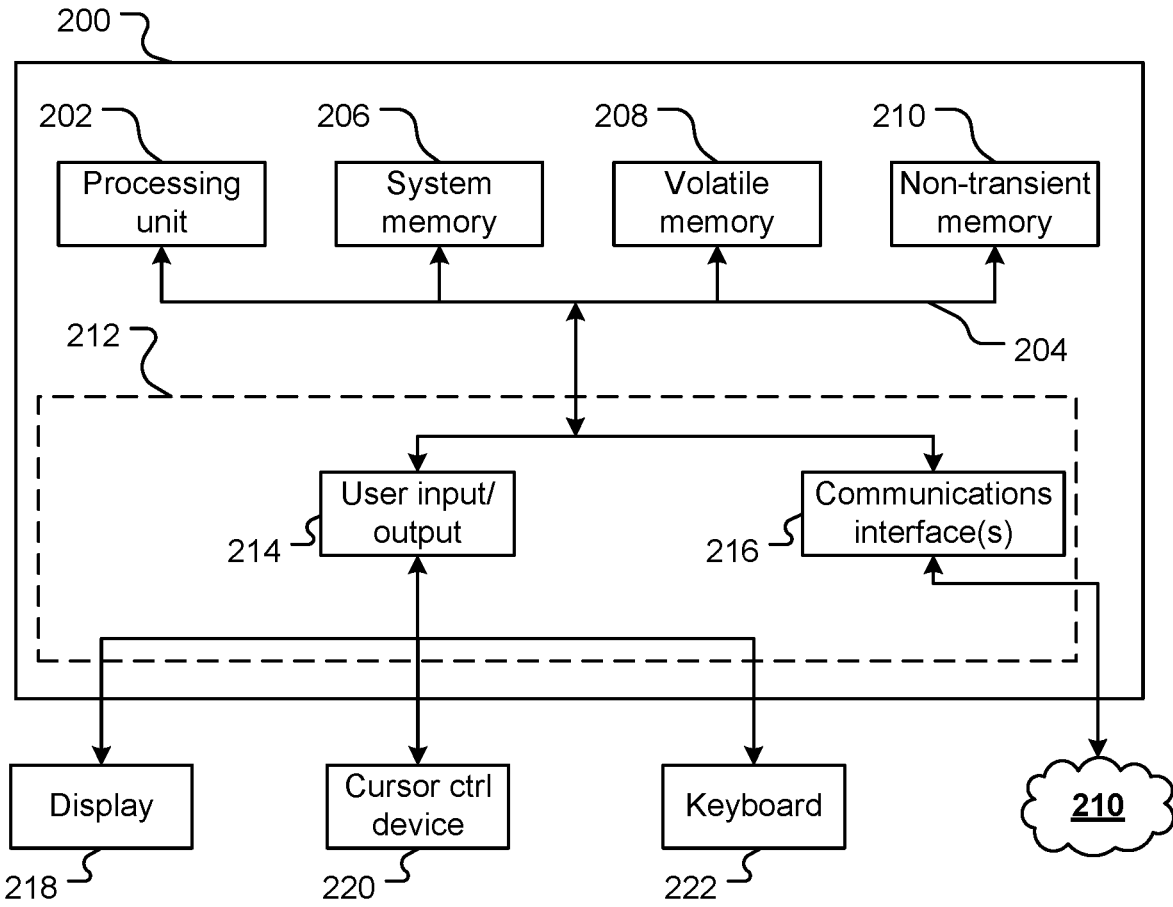
FIG. 2 is a block diagram of a computer processing system configurable to perform various features of the present disclosure.

Turning to FIG. 2, a block diagram depicting hardware component of a computer processing system 200 is provided. The computer processing system 100 of FIG. 1 may be a computer processing system such as 200, though alternative hardware architectures are possible.

Computer processing system 200 includes at least one processing unit 202. The processing unit 202 may be a single computer processing device, for example a central processing unit, graphics processing unit, or other computational device, or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with one or more machine readable storage devices (also referred to as memory devices). Computer readable instructions and/or data which are executed by the processing unit 202 to control operation of the processing system 200 are stored on one more such storage devices. In this example system 200 includes a system memory 206 (e.g. a BIOS), volatile memory 208 (e.g. random access memory such as one or more DRAM modules), and non-transient memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Generally speaking, and depending on the particular system in question, devices to which system 200 connects-whether by wired or wireless means-include one or more input devices to allow data to be input into/received by system 200 and one or more output device to allow data to be output by system 200.

By way of example, where system 200 is a personal computing device such as a desktop or laptop device, it may include a display 218 (which may be a touch screen display and as such operate as both an input and output device), a cursor control device 220 (e.g. a mouse, trackpad, or other cursor control device), a keyboard 226, and/or other input devices. Alternative types of computer processing systems, with additional/alternative input and output devices, are possible.

System 200 also includes one or more communications interfaces 216 for communication with a network, such as network 110 of FIG. 1. Via the communications interface(s) 216, system 200 can communicate data to and receive data from networked systems and/or devices.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium such as non-transient memory 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, in FIG. 1 computer processing system 100 (which may be or include the hardware components of computer processing system 200) includes and executes application 104.

In some cases part or all of a given computer-implemented method will be performed by system 200 itself, while in other cases, for example in client-server implementations, processing may be performed by other devices in data communication with system 200.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Once a design has been created or edited, application 104 may provide various options for outputting that design. For example, application 104 may provide a user with options to output a design by one or more of: saving the design to local memory of system 302 (e.g. non-transient memory 210); saving the design to remotely accessible memory device; uploading the design to a server system; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

Figure 3:
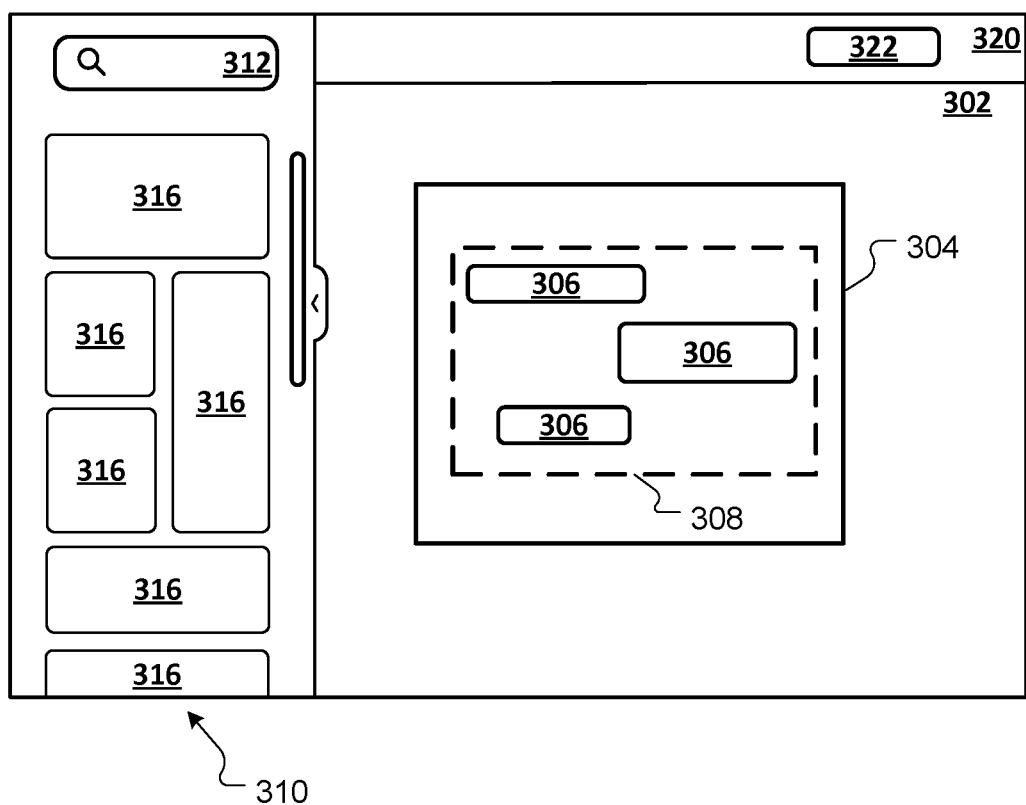
FIG. 3 depicts an example design creation graphical user interface.

FIG. 3 shows an example of a user interface (UI) 300 displayed by a computer processing system, for example the system 102. The application 104 may configure system 102 to display the UI 300.

UI 300 includes a design preview area 302. Design preview area 302 may, for example, be used to display a page 304 of a design that is being created and/or edited. It will be appreciated that the design may constitute one page or a plurality of pages.

The design includes a plurality of design elements 306, which may be arranged according to the processes described herein. The UI 302 provides functionality to select a group of the plurality of design elements 306. For example, the use may operate a point an click device to designate an area for selection, such as a selection box 308. The design elements 306 in the selection box 308 may be selected and the element arrangement performed with respect to the selected design elements 306 and not the unselected design elements 306. Other methods of selecting plurality of design elements 306 may be used.

In this example, UI 300 also includes search area 310. Search area 310 may be used, for example, to search for design elements that application 104 makes available to a user to assist in creating designs. Different types of elements may be made available, for example text elements, geometric shapes, charts, tables, photos, vector graphics, videos, and/or other types of elements.

In this example, search area 310 includes a search control 312 via which a user can submit search data (e.g. a string of characters). When a user submits a search, for example by entering search text via search control 312, application 104 may display previews 316, for example thumbnails or the like, of any search results. In certain embodiments, a user may add an element to a design by dragging a particular preview 316 of an element and dropping it on the design page 304. Design elements may be added to a design in alternative ways.

Depending on the particular implementation, the previews 316 displayed in search area 310 (and the elements those previews correspond to) may be accessed from various locations. For example, the search functionality invoked by search control 312 may cause application 104 to search for existing design elements that are stored in locally accessible memory of the system (e.g. 102) on which application 104 executes (e.g. non-transient memory such as 210 or other locally accessible memory), elements that are stored at a remote server, and/or elements stored on other locally or remotely accessible devices.

UI 300 also includes a controls area 320 which may be used to display any appropriate controls. Such controls may include, for example: one or more permanent controls (e.g. controls such as save, download, print, share, publish, and/or other controls that are frequently used/widely applicable and that application 104 is configured to permanently display); one or more user configurable controls (which a user can select to add to or remove from area 320); and/or one or more adaptive controls (which application 104 may change depending, for example, on a type of design element that is currently selected/being interacted with by a user). For example, if a text element is selected, application 104 may display adaptive controls such as font style, type, size, position/justification, and/or other font related controls may be displayed. Alternatively, if a vector graphic element is selected, application 104 may display adaptive controls such as fill attributes, line attributes, transparency, and/or other vector graphic related controls may be displayed.

In the present example, UI 300 includes an arrange elements control 322. The arrange elements functionality performed responsive to selection of the arrange elements control 322 is described further below. Application 104 may display the arrange elements control 322 at all times, or may display the arrange elements control in response to detecting one or more particular events. For example, application 104 may display the arrange elements control 102 in response to detecting that a user has selected two or more design elements.

In other embodiments, the arrange elements functionality is performed responsive to an action other than receipt of a user input through a UI. For example, the arrange elements functionality may be performed by a module responsive to being passed a set element data and returns updated element positions. The set of element data may be received with or without other data relating to the design. For example the set of element data may be extracted from the data defining a design or the entirety of the data defining a design may be passed to the module.

FIG. 4 to FIG. 8 show example processes for arranging elements of a design. The sequence of processes in these figures are not intended to limit the element arranging process to that order or to limit the element arranging process to serial processing. For example, steps shown in sequence in the figures may be run in parallel. The description of FIG. 4 to FIG. 8 is made with reference to the example of the processes being performed by the system 102 of FIG. 1, which causes the display of the user interface 300 of FIG. 3. The processes may be performed by other computer processing systems, with other user interfaces and in other embodiments the use of a user interface may be omitted.

Figure 4:
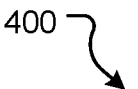
FIG. 4 is a flowchart of one embodiment of a process for element arranging.
Figure 4:
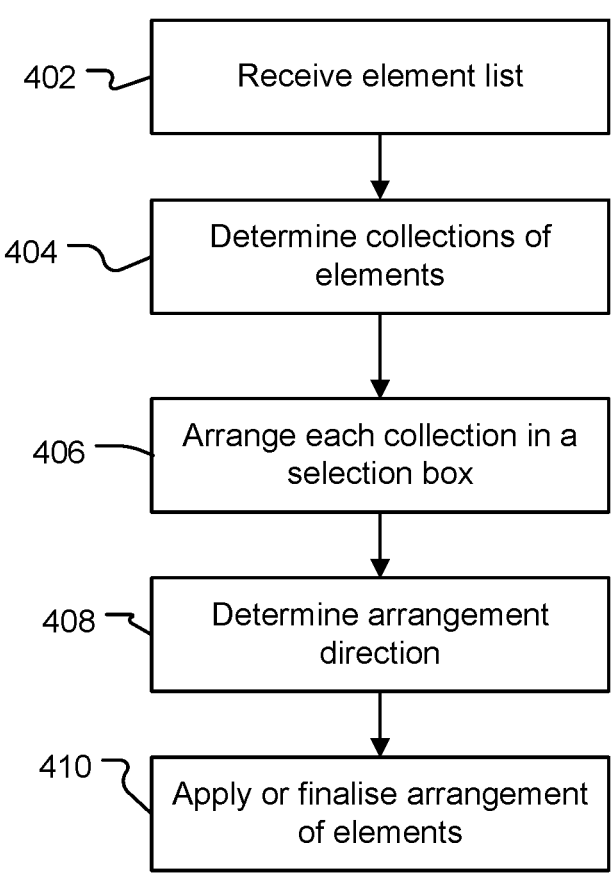

FIG. 4 shows an embodiment of an element arranging process 400, which may be performed by the system 102. At step 402, an element list is received. The element list may be received responsive to a user selecting the arrange elements control 322.

The element list identifies a plurality of elements in the design page, for example all of the elements on the design page or the selected elements in the design page. In some embodiments the arrange elements control 322 is actuated by a user after a plurality of elements have been selected and the element list identifies the selected elements. In some embodiments, the user may select the plurality of elements through the use of the selection box 308. The selection box 308 may be a subsection of the design page 304 and select some or all of the elements on the design page. In other embodiments, the user may select the arrange elements control to begin the selection of elements to be arranged and the element list is generated based on that selection.

The elements in the list of elements each have associated data. The associated data may be, for example, the coordinates, width and height of the element on the design page.

At step 404, the system 102 determines collections of elements within the plurality of elements identified by the element list. The system 102 may determine that a group of elements are in a collection with each other if the elements overlap in a direction. For example, one or more collections may be defined by a corresponding one or more groups of elements which overlap with each other in a vertical or "y" coordinate direction. As described further herein, elements that overlap in the y coordinate direction are at least initially allocated to a row collection. For example in FIG. 9A elements 904A, 904B and 904C all overlap with each other in the y coordinate direction, over the extent indicated 905A. This process may be performed for another dimension, for example to determine overlapping elements in a horizontal or "x" coordinate direction. Overlapping elements in the x coordinate direction may be allocated to a column collection. For example in FIG. 9A elements 904A, 904D and 904G all overlap with each other in the x coordinate direction. In some embodiments, collection determination is run for both dimensions, determination of overlap in the y coordinate dimension to obtain row collections and in the x coordinate direction to obtain column collections.

In some embodiments step 404 determines collections of elements in only one direction. For example, step 404 may in effect determine rows of the elements from the element list and not determine columns of those elements. The determination in one direction may be determined based on user input. For example a user may provide an input indicating a request to arrange the elements into rows, or alternatively provide an input indicting a request to arrange the elements into columns. In these embodiments steps 408 and 410 described below may be omitted and the arranged elements are determined at the end of step 406.

In other embodiments step 404 determines collections of elements in more than one direction, for example determining collections for the horizontal direction and determining collections for the vertical direction. The determination may again be responsive to user input, such as an input indicating a request to arrange the elements without specifying whether they should be arranged into rows or columns.

At step 406, system 102 arranges each determined collection in a direction within an area of the design, which is called herein a selection box. In some embodiments, this arrangement includes one or more of distributing each element in a collection in the list of collections evenly across the selection box, aligning elements (e.g. middle aligning the elements into a row or centre aligning the elements into a column), and positioning each group of elements in a collection, for example positioning the rows or columns. Positioning a row or column includes one or both of positioning the rows or columns with respect to each other and/or with respect to an area of the design, for example evenly spacing them across the selection box and/or aligning an edge of a row (e.g. left align) or a column (e.g. top align) with the selection box. Where there are collections determined for different arrangement directions, the arrangement is done for the arrangement direction associated with the collection.

At step 408, the system 102 determines which arrangement direction to utilise or recommend for arranging the elements identified by the element list. The arrangement direction to utilise or recommend is based on an area of superimposition across all the elements in the selection box after they have been arranged in step 406. The utilised or recommended arrangement direction is the one that has the minimum area of superimposition of the elements. As used herein superimposition of elements means that one element is in a location so that at least a part of it extends over the same space in the design as another element.

At step 410, the system applies or finalises the arrangement of elements. The finalised arrangement may be displayed, for example, on the design page 304. In some embodiments the display may transition immediately. In other embodiments the elements may be animated, for example with each element moving from its current position to its arranged position.

Figure 5:
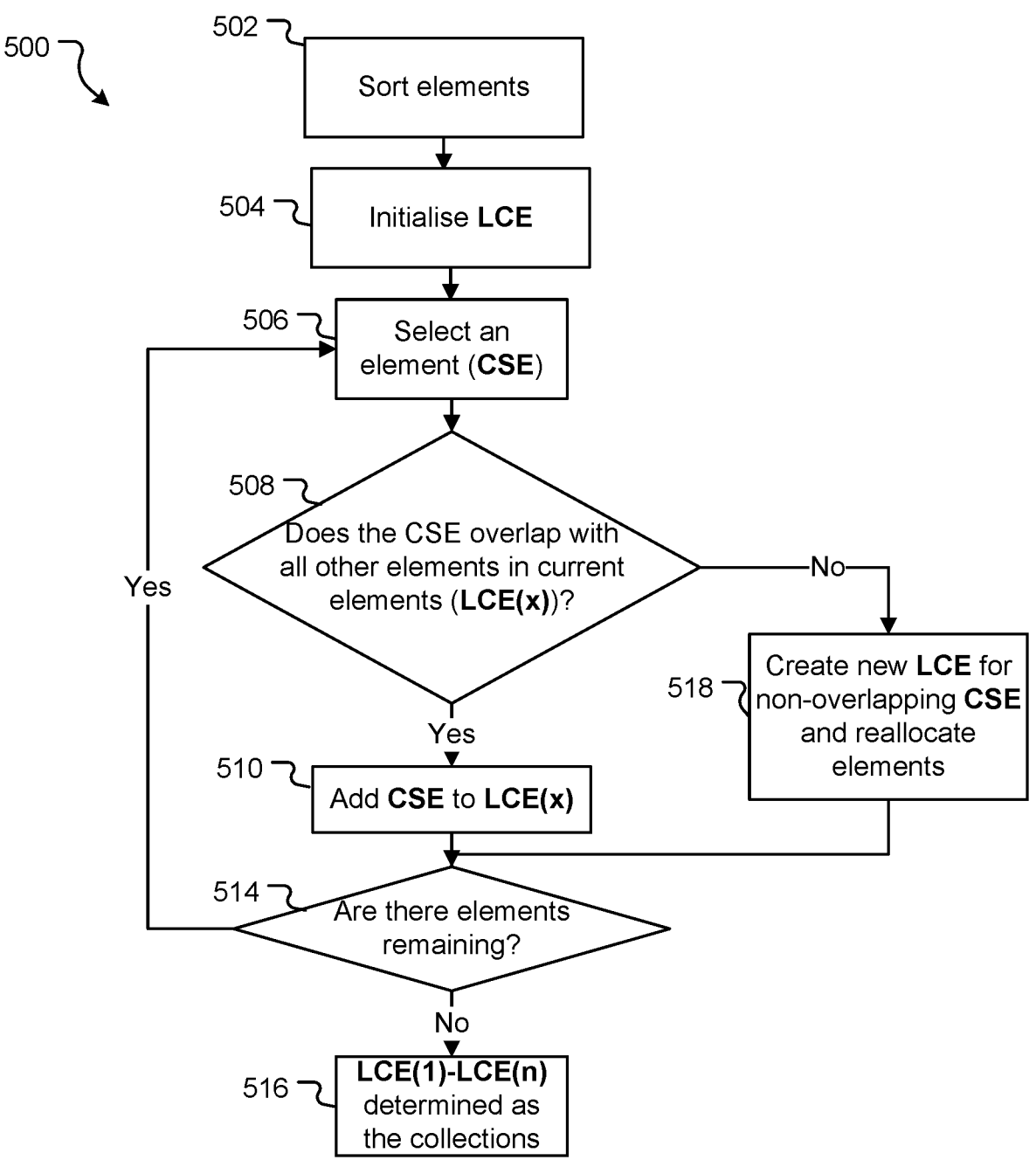
FIG. 5 is a flow chart of one embodiment of a process for collection detection.

Turning to FIG. 5, a detailed illustration of an embodiment of a collection determination process 500 is illustrated. The collection determination process may be performed, for example, to implement step 404 of FIG. 4.

At step 502, a list of elements (e.g. the list of elements received as per step 402 of FIG. 4) is sorted by the system 102. The sorting of the list of elements is based on the location of the elements along a direction ("the sorting direction" or "the sort direction") within or across the design containing the elements identified by the list of elements. The sorting direction may be perpendicular to a direction for arrangement of the elements. In particular, for most designs the elements may be arranged horizontally into rows or vertically into columns and the sorting direction may correspondingly be vertical or horizontal. A sorted list is produced for each arrange direction of the elements.

In some embodiments, the sorting of the list of elements is based on a location of a beginning of the element in the sorting direction. For example, if the sorting direction is the horizontal or x-axis direction from left to right, the order of the sorted elements may be determined by the location along the x-axis of a left-most pixel of the element. Alternatively, the sorting of an element may be with reference to the location of a pixel associated with each element, for example the location of a top left corner of a bounding box defined for the element. A bounding box may be a rectangle with edges that intersect or are close to (e.g. on the next pixel outwards) of the leftmost, rightmost, topmost and bottommost pixels of an element. The area of the bounding box for an element may depend on the orientation of the element and the use of a bounding box allows consistent processing regardless of the orientation of the elements. By way of example, after a horizontal or x-axis sorting, the leftmost element may be placed in the first location in the sorted list, the second leftmost element placed in the second location in the sorted list and so forth. Similarly, if the sorting direction is the vertical or y-axis direction from top to bottom the sorting may be determined by the location along the y-axis of an uppermost pixel of the element or the location of a top left corner of a bounding box defined for the element.

As described in more detail below, the system 102 keeps track of the current elements that have been iterated over as part of the collection determination process 500. This tracking may be done, for example, using a list of current elements. A list of current elements is generally designated as "LCE". In step 504 a LCE is initialised, including allocating the first element in the sorted list of elements from step 502 to the LCE. Also, as described further below, there may be more than one list of current elements, and the individual lists are designated "LCE(x)", where (x) is an integer number from the set 1 to n. For example LCE(1) may indicate an initial list of current elements created in step 504 and when a new LCE is required the system 102 may create a second list of current elements LCE(2) and so forth, resulting in n LCE's.

Starting at step 506, the elements in the sorted list of elements are iterated over. A currently selected element in the iterative process is designated "CSE" and step 506 includes selecting the CSE. In the first iteration the CSE is the second element in the sorted list from step 502. In the next iteration the CSE is the third element in the sorted list and so forth for further iterations.

At step 508, the system 102 determines whether the CSE overlaps in the sorting direction with all other elements in the existing LCE(x). In some embodiments any overlap is sufficient, even if it is for example only by 1 pixel. In other embodiments there may be a threshold amount of overlap required for the system 102 to determine that there is an overlap, which threshold may be determined in absolute terms (e.g. 5 pixels or more) or in percentage terms (e.g. at least 5% of the CSE overlaps with all other elements in the LCE(x) being considered).

If, at step 508, the system determined that there is overlap between the CSE and all other elements in an existing LCE(x), then the CSE is added to that LCE(x) at step 510. If, at step 508, the system 102 determines that not all the elements in any LCE(x) overlap with the CSE, then in step 518 the system creates a new LCE and allocates the CSE to the new LCE. The CSE that does not overlap with any element in any existing LCE(x) is a founding member of the new LCE. The element from the existing LCE(x) that does not overlap with the founding member of the new LCE is deemed the founding member of the existing LCE(x). Any element in the existing LCE(x) that has more overlap with the founding member of the new LCE than with the founding member of its current LCE is reallocated to the new LCE. Further details on the determination of overlap are provided later herein.

Following either step 510 or step 518, at step 514 the system 102 checks for the next element in the sorted list of elements and if there are elements remaining, the process returns to step 506 for completion of the next iteration. Once there are no elements remaining at step 514, then in step 516 the set of LCEs, LCE(1) to LCE(n), are determined as the collections of elements.

Figure 6:
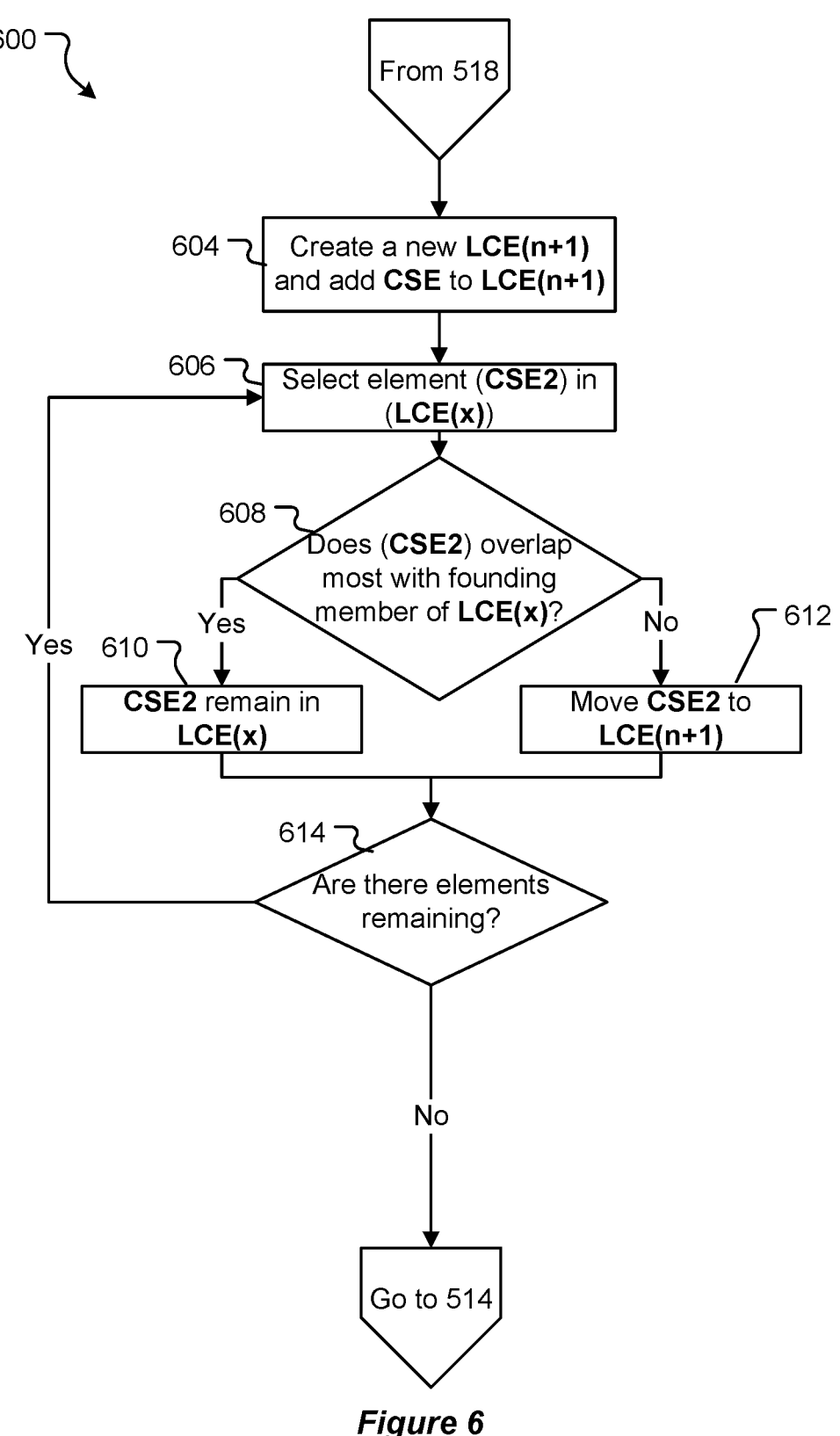
FIG. 6 is a flow chart of one embodiment of a process for creating a new collection and reallocating elements between an existing collection and a new collection.

FIG. 6 shows an example process 600 for creating new LCEs and reallocating elements. The process 600 may be performed, for example, to implement step 518 from FIG. 5.

At step 604, in response to the determination in step 508 the system 102 creates a new LCE, which may be designated LCE(n+1). The system 102 also adds the CSE considered in step 508 to LCE(n+1). That CSE may be viewed as a founding member of LCE(n+1).

Commencing at step 606, the elements in the existing LCE(x) are iterated over. In step 606 an element from an LCE(x) is selected as a second current selected element, CSE2. In step 608 the overlap in the sorting direction of CSE2 with the founding member of the existing LCE(x) is determined and compared with the overlap in the sorting direction of CSE2 with the founding member of LCE(n+1). If the overlap with the founding member of the existing LCE(x) is the greater overlap, the process proceeds to step 610 and the CSE2 remains in the existing LCE(x). It will be appreciated that step 610 is included for purpose of explanation and is equivalent to taking no action. If the overlap with the founding member of the existing LCE(x) is the lesser overlap, the process proceeds to step 612 and the CSE2 is removed from the existing LCE(x) and added to LCE(n+1).

At step 614, the system determines whether all elements across the existing LCE(x) have been iterated over. If there are elements remaining, the process returns to step 606 to select a further element. If there are no remaining elements the process for creating a LCE is complete. The system may then return to the process of FIG. 5, in particular by going to step 514 and the newly created LCE(n+1) is deemed to be the existing LCE(x).

Figure 7:
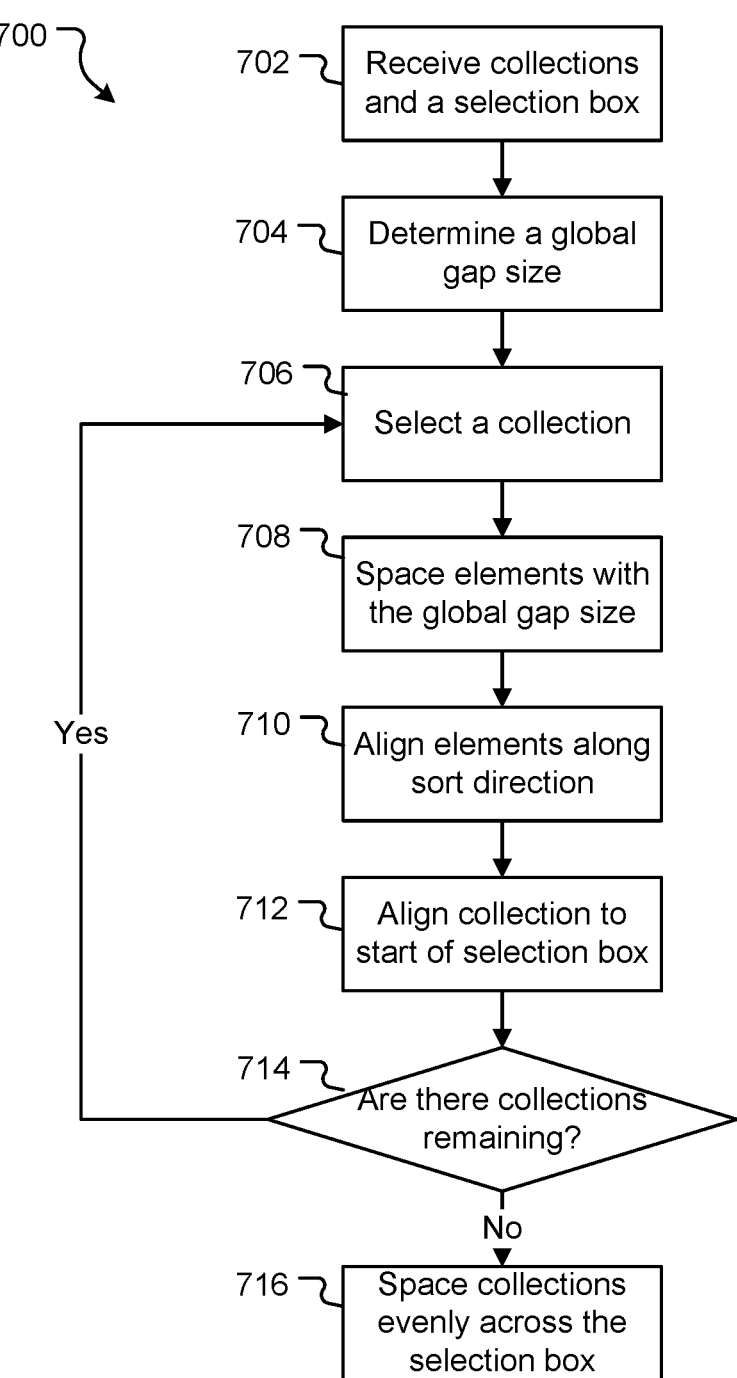
FIG. 7 is a flow chart of one embodiment of a process for arranging elements in a set of collections of elements.

FIG. 7 shows a process 700 for arranging elements in a set of collections of elements. The process 700 is an example implementation of step 406 from FIG. 4. The process 700 arranges the elements in each collection along an arrangement direction. For example the process 700 arranges the elements in a collection horizontally into a row or vertically into a column and repeats the process for each collection, until all collections have been arranged into rows or into columns.

At step 702 the collections and a selection box are received for processing by the system 102. The collections of elements in the set of collections of elements may, for example, be the collections identified in step 402 of FIG. 4 or step 516 of FIG. 5. The selection box indicates the area within which the elements are to be arranged.

The selection box may be the selection box 308 described herein or may be a new selection box, for example a new selection box entered by a user in a like manner to the selection box 308. Alternatively the selection box may be deemed by the system to span a page on which the elements to be arranged are located. For example when arranging the elements into rows the selection box may horizontally span the page and vertically span between the uppermost point and lowermost point of all elements in the collection. A user may adjust a selection box, to decrease or increase the horizontal span and/or increase or decrease the vertical span.

Figure 10A:
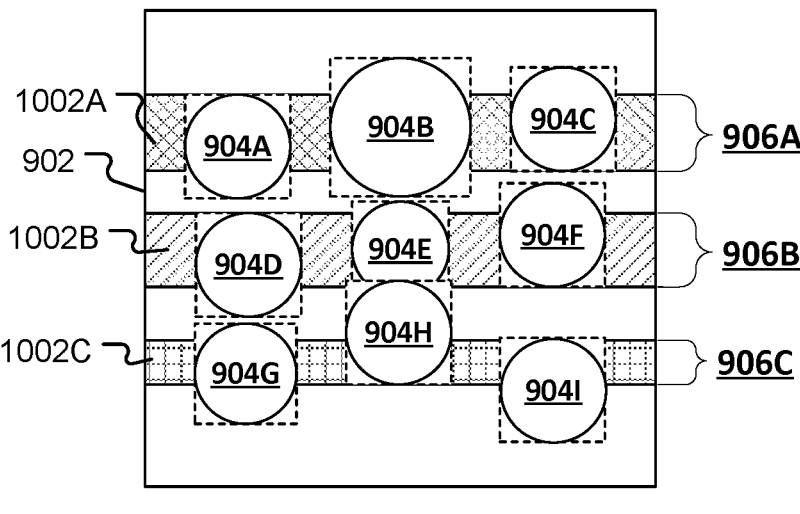
FIGS. 10A-10E show a diagrammatic example of a process for arranging elements in a set of collections of elements.

At step 704, the system 102 determines a global gap size. As described herein below, the global gap size is applied when arranging elements in each collection. In some embodiments the global gap size is the largest gap size that does not result in any element extending beyond the bounds of the selection box. In some embodiments the global gap size is determined as the smallest gap size determined for a collection in the set of collections. The gap size for a collection may be determined as the gap between the elements in the collection if all the elements in the collection are spaced evenly across the entirety of the selection box in the arrangement direction. For example, when the arrangement direction is horizontal, the first element in a collection may be placed so that its left edge intersects the left edge of the selection box, the last element in the collection placed so that its right edge intersects the right edge of the selection box, and all other elements in the collection (if any) are distributed between the first and the last elements so that the gap between the elements is the same. This gap is the gap size for that collection. If there are only two elements in the collection the gap size is the gap between those two elements. After computing the gap size of all the collections, the global gap size is determined as the smallest gap size across the collections. In other embodiments, instead of placing the elements to intersect the edges of the selection box, the elements are placed apart from the edge of the selection box by the same distance as the gap between elements (a diagrammatic example of this alternative embodiment is shown in FIG. 10A).

In some embodiments step 704 includes accommodating for the effects of a spanning element. A spanning element is one that spans across the collection. A spanning element may be identified by determining an inquiry: space all collections evenly according to a global gap size determined with reference to all collections; and determine an element as a spanning element if along the axis of the arrangement direction the element begins before all other elements in the collection and ends after all other elements in the collection. For example, if the arrangement direction is horizontal. The spanning element's left most point will be further left than any other element's leftmost point, and the spanning element's rightmost point will be further right than any other element's rightmost point. The system 102 in determining the global gap size may ignore the collections that include a spanning element. In other words, the global gap size may be recalculated for only the collections that do not include a spanning element.

In some embodiments, the global gap size is not applied to collections with a spanning element, in which case the system 102 may determine a collection gap size for each collection with a spanning element. The collection gap size may be determined by calculating the length of the span of the collection and subtracting the span of all the elements in the collection except the spanning element. The system 102 may then divide the remaining length with the number of elements in the collection (including the spanning element) to obtain the collection gap.

In some instances there may be collections, when elements are spaced evenly across the selection box in which the elements overlap. In some embodiments the system 102, in determining the global gap size, may ignore the collections in which there are elements which overlap.

At step 706, the system selects a collection from the set of collections. In steps 708 to 712 the selected collection is arranged in an arrangement direction. This includes determining a spacing of the elements in the collection along the arrangement direction, aligning the elements in the collection with each other and aligning the collection with an edge of the selection box. It will be appreciated that steps 708 to 712 are examples of steps in which the order of completion may be varied.

At step 708 the elements in the selected collection are spaced evenly according to the global gap size determined at step 704. In other words, each element in the collection is located along the arrangement direction so that the gap to each adjacent element is the same and equals the global gap size. In embodiments in which collections with spanning elements are processed differently, if the selected collection includes a spanning element, the elements in the selected collection except the spanning element are spaced across the spanning element according to the collection gap size, rather than the global gap size.

At step 710, the elements are aligned along the arrangement direction. For example, if the arrangement direction is horizontal, step 710 may determine a height location for each element in the collection so that a middle point of each element is aligned with a middle point for all the other elements in the collection. If the arrangement direction is vertical a horizontal location for the elements in the collection is determined that aligns the centre of the elements.

At step 712, the collection is aligned to the start of the selection box. For example, when arranging horizontally into rows, the collections may be shifted so that the leftmost edge of the first element in the collection intersects the left edge of the selection box. When arranging vertically into columns, the collections may be aligned so that the top edge of the first element intersects the top edge of the selection box.

At step 714, the system 102 determines if there are any remaining collections in the set of collections. If so, the process returns to step 706. If not, in at step 716, the collections are spaced evenly across the selection box in the sort direction (i.e. perpendicular to the arrangement direction). For example, if the arrangement direction is horizontal, then steps 708 to 712 arrange the collections of elements into rows and then step 716 distributes the rows vertically across the selection box, the first collection aligned with the top of the selection box, the last collection aligned with the bottom of the collection box and any further collections distributed evenly across the selection box. If the arrangement direction is vertical, then steps 708 to 712 arrange the collections of elements into columns and then step 716 distributes the columns horizontally across the selection box.

In some embodiments the process 700 of FIG. 7 (which may follow the process 500 of FIG. 5) is repeated, for example once for a horizontal sort direction (or vertical arrangement direction) and once for a vertical sort direction (or horizontal arrangement direction), to generate collections of elements arranged in columns and collections of elements arranged in rows respectively. In some embodiments the collections of elements arranged by the process 700 are both presented to a user, who may select which one to utilise. For example, both arrangements of elements may be presented simultaneously on a display device of the system 102. In other embodiments the system 102 may make a determination of the arrangement direction to be applied, that is determine whether to arrange the elements into rows or columns. The system 102 may then either automatically apply the determined arrangement without further user input or indicate to the user the determined arrangement.

In some instances, the collections of arranged elements resulting from the process 700 include a gap between each element in each row or column. In other instances there will be an overlap between elements. For example if the sum of the width of all elements arranged in a row is greater than the width of the selection box, then the left and right sides of adjacent elements will overlap. Similarly there may be an overlap in the vertical direction for elements arranged in a column. In some embodiments the system 102 is configured to determine the direction that results in the least overlap. The system 102 may then arrange the elements using an arrange direction corresponding to the direction that results in the least overlap or provide a recommendation to arrange using that arrange direction. Where the overlap is equal, for example if the selection box is large enough to accommodate all elements in both directions without a gap, the system 102 may determine the arrange direction using other variables. For example, the system 102 may determine an arrange direction that corresponds to the longer dimension of the selection box, or if the selection box is square use a default direction (e.g. horizontal).

Figure 8:
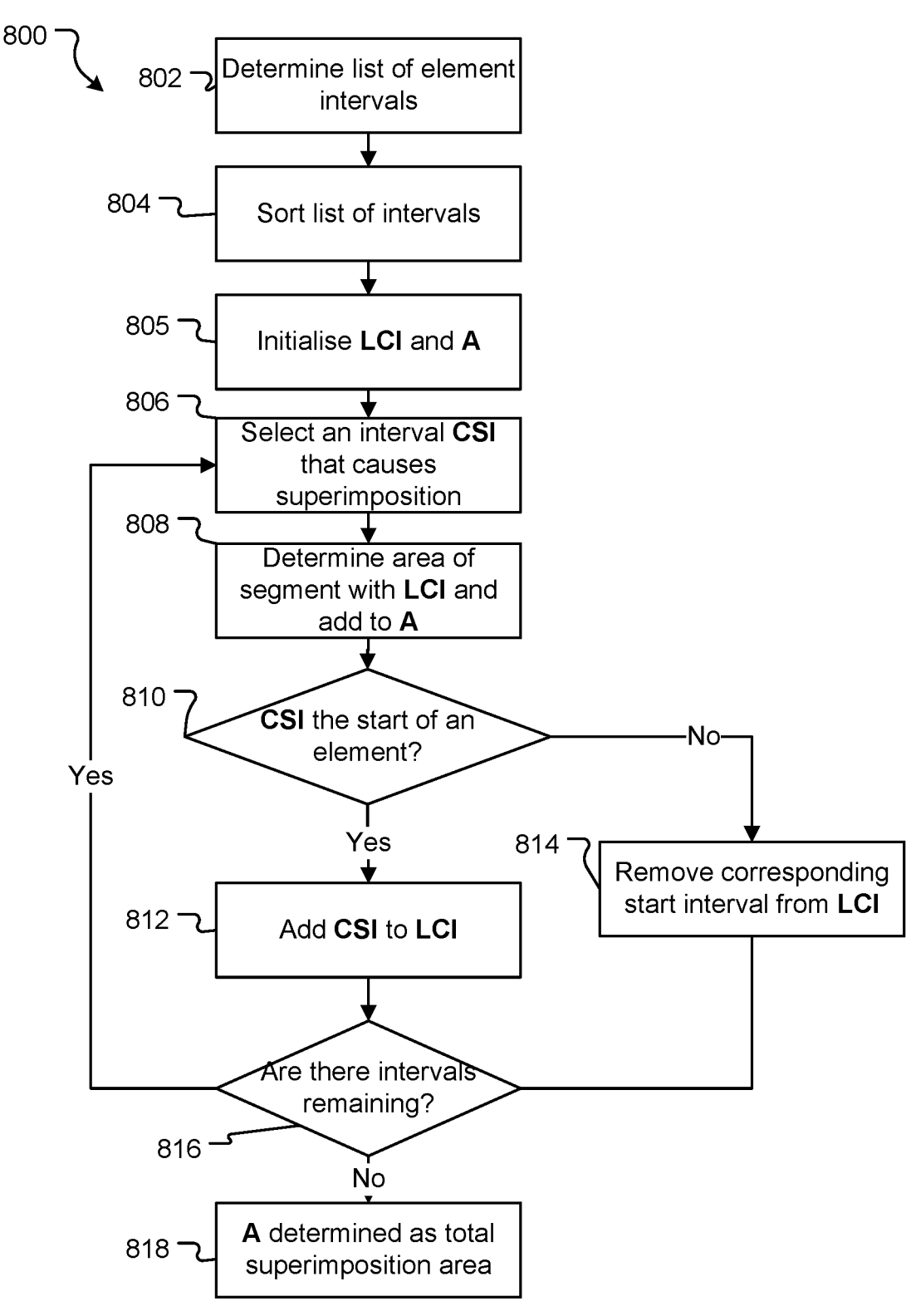
FIG. 8 is a flow chart of one embodiment of a process for determining an arrangement direction to be applied.

FIG. 8 shows an embodiment of a process 800 for determining an arrangement direction to be applied. For example, the process 800 determines whether elements should be arranged into rows or arranged into columns. The process 800 is an example implementation of step 408 from FIG. 4.

The process 800 may be applied to the arrangement of elements determined according to the process 700 of FIG. 7. The following description is made with reference to that example.

At step 802, start and end intervals for each element are determined. The start and end intervals correspond to a beginning and an end of an element according to the arrangement direction. For example, if the arrangement direction is horizontal, the start interval of an element may commence at the leftmost pixels of the element or a bounding box of the element and the end interval corresponds to the rightmost pixels of the element or its bounding box respectively. The interval in some instances may be a range of pixels that correspond to the height of the element or the bounding box of the element. Alternatively, if the arrangement direction is vertical, the start interval of an element may be the top most pixels of the element or its bounding box and the end interval may be the bottom most pixels of the element or its bounding box.

At 804, the intervals determined in step 802 are sorted by the starting interval, from earliest to latest. For example, if the arrangement direction is the horizontal or x-axis direction from left to right, the order of the sorted intervals may be determined by the location of the interval along the x-axis. Similarly, if the arrangement direction is the vertical or y-axis direction from top to bottom, the sorting may be determined by the location along the y-axis of the interval.

As described in more detail below, system 102 keeps track of the current intervals that have been iterated over as part of the arrangement direction determination process 800. This tracking may be done for example, using a list of current intervals. A list of current intervals is generally designated as "LCI". In step 805 a LCI is initialised, including allocating the first element in the sorted list of intervals from step 804. Also at step 805, the total area of superimposition "A" is initialised to 0. A is used to keep track of the cumulative sum of superimposition as described further below.

Starting at step 806, the intervals in the sorted list of intervals are iterated over. A currently selected interval is designated "CSI" and step 806 includes selecting the CSI. In the first iteration the CSI is the second interval in the sorted list from step 804. In the next iteration the CSI is for the third element in the sorted list and so forth for further iterations.

At step 808, the system 102 determines the superimposition area with all the intervals in LCI and CSI. The superimposition area is the area of two or more bounding boxes of elements which lie on top of one another. It can be calculated by determining the height of total overlap between all intervals in LCI and CSI and multiplying by a distance between intervals. The superimposition area is then added to A.

At step 810, system 102 checks if CSI corresponds to the start interval of an element. If at step 808, the system determines that it does correspond to the start interval of an element, then at step 812, CSI is added to LCI. However, if the system determines that CSI does not correspond to the start interval of an element (i.e. it is the end interval of an element), then at step 814 the corresponding start interval of the element is removed from LCI.

Following either step 812 or 814, at step 816, the system 102 checks for the next interval in the sorted list of intervals and if there are intervals remaining, the process returns to step 806 for completion of the next iteration. Once there are no intervals remaining at step 816, then in step 818 the total area of superimposition "A" has been determined for the arrangement direction.

In some embodiments the process 800 of FIG. 8 is repeated for all directions of arrangement according following process 700 of FIG. 7. Once process 800 has been applied to all directions of arrangement and has calculated "A" for all directions of arrangement, system 102 may select the optimal direction of arrangement. In some embodiments, the optimal direction of arrangement may be the direction of arrangement which produces the smallest "A".

Upon determining the optimal direction of arrangement, system 102 at step 410 finalises the arrangement of the elements according to the corresponding process 700 for the particular arrangement direction.

Figure 9A:
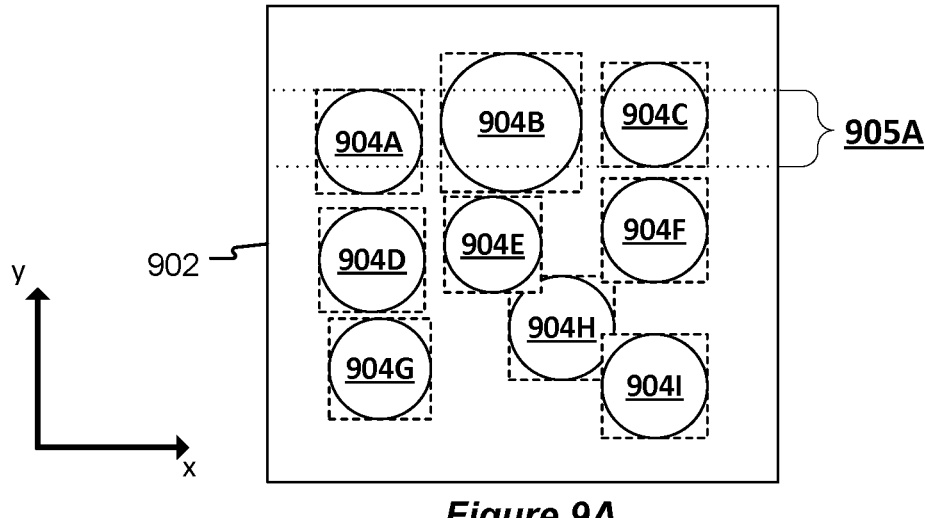
FIGS. 9A-9B show a diagrammatic example of collection detection.
Figure 9B:
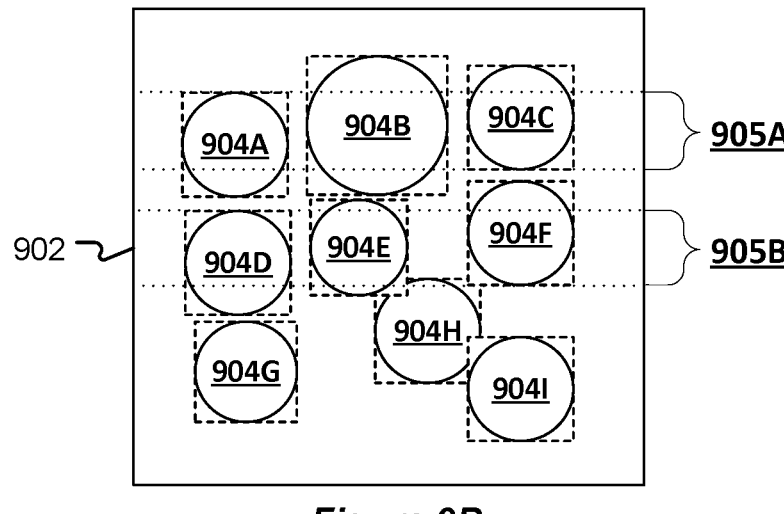

Turning to FIG. 9A-9B, a diagrammatic example of the operation of the process 500 of FIG. 5 is described.

FIG. 9A depicts a selection area 902 with a set of elements 904A-904I in an initial state. In this example each element 904 is a circle with the broken line square around each element 904 indicating its bounding box. The selection area 902 may be the selection box 308 and/or may be the selection box utilised in process 700.

In order to automatically arrange the elements 904, the system 102 collects a list of elements. The elements are then sorted in order of location. Taking the example of sorting based on a top-left corner of a bounding box (the dashed lines around each element) in the vertical direction, top to bottom, the sorted elements may be in the order 904B, 904C, 904A, 904F, 904E, 904D, 904H, 904G, 904I.

The system 102 iterates through the sorted elements, keeping track of the elements that have been selected. In each iteration, the system 102 checks if the element currently being iterated through has a span which overlaps with all elements in a collection. For example, if the arrangement direction is horizontal, the spans are horizontal. Element 904B is a founding member of an initial collection. The next element in the sorted elements 904C overlaps with element 904B so is allocated to the same collection. The next element 904A overlaps with both 904B and 904C, so is allocated to the same collection. In this example, elements 904B, 904C and 904A have an overlap area marked 905A in FIG. 9A.

As can be seen in FIG. 9A, element 904F is outside of the overlap area 905A, due to not having any overlap with element 904C. A new collection is therefore started, with element 904F being the founding element for the new collection. The element in the existing collection that does not overlap with the founding element for the new collection, in this example element 904C, is deemed the founding element for the existing collection.

When a new collection is started, a determination is made whether any element in the existing collection overlaps more with the founding element of the new collection. If so, that element is moved from the existing collection to the new collection. In this example elements 904B and 904A each overlap both of the elements 904C and 904F. However, neither overlap more with element 904F than with element 904C. Both are therefore retained in the same collection as element 904C.

The system 102 then continues to iterate through the sorted elements allocated elements 904E, 904D and 904H to the same collection as element 904F. Similar to above, the system 102 identifies that element 904G does not overlap with all the elements in the collection founded by element 904F (or in other words element 904G falls outside of overlap area 905B shown in FIG. 9B) and starts a second new collection, with element 904G being the founding element of the second new collection. From the existing collection, elements 904D and 904E do not overlap more with element 904G than they overlap with element 904F, so they remain in the existing collection with element 904F. Element 904H however does overlap more with element 904G than it overlaps with element 904F. Element 904H is therefore removed from the existing collection and allocated to the new collection with element 904G.

Once all the elements have been iterated over, the algorithm in the present example will present three collections, one including elements 904A, 904B, 904C, another including elements 904D, 904E, 904F and the third including elements 904G, 904H, 904I.

Turning to FIG. 10A-10E, a diagrammatic example of the operation of the process 700 of FIG. 7 is described. The elements from FIG. 9A-9B are also used in this example. As described above, these have been allocated to collections based on overlap. The collections and a representation of their respective overlap are designated 906A, 906B and 906C.

Figure 10B:
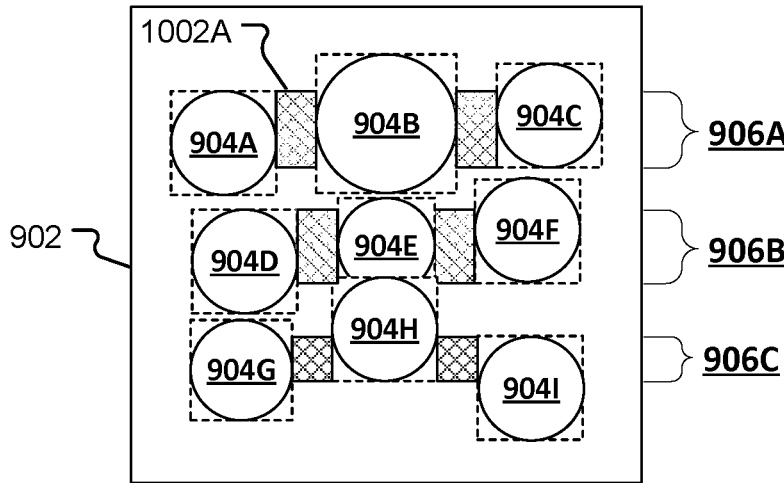
Figure 10C:
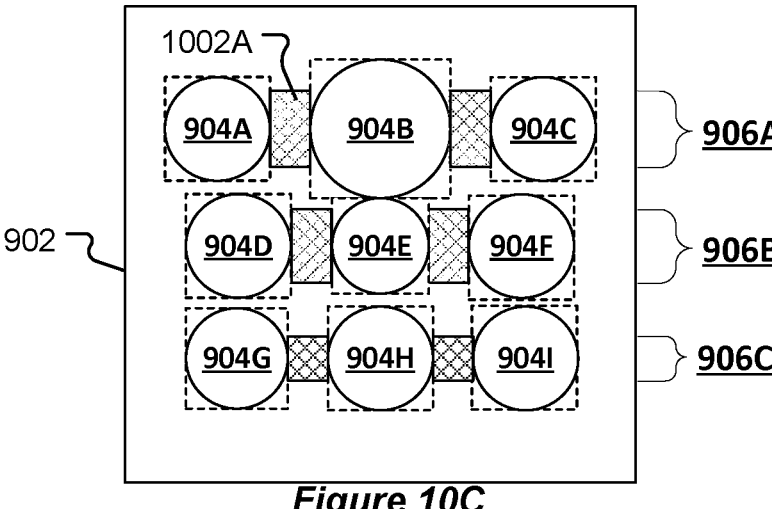
Figure 10D:
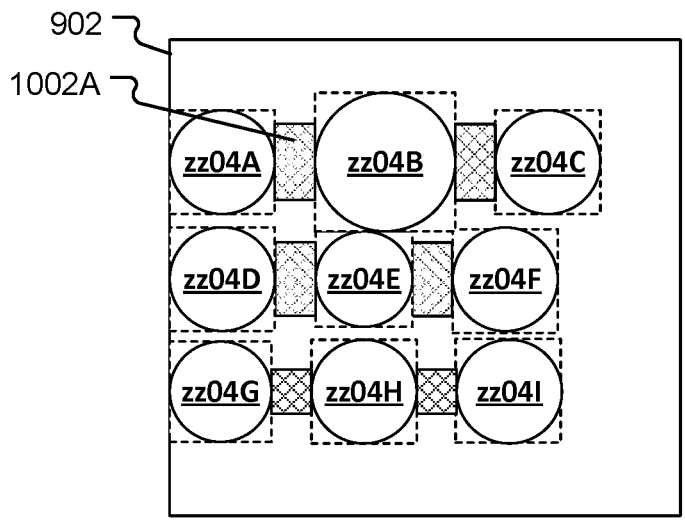
Figure 10E:
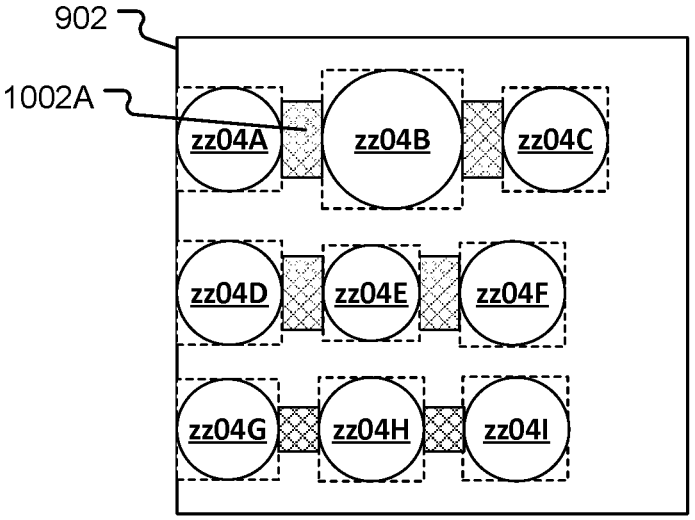

FIG. 10A shows a determination of a global gap size (e.g. as per step 704 of process 700). The elements within each of the collections 906A-C are spaced evenly across the selection box. As such, the algorithm may compute the respective gap size of each collection 1002A-C. The algorithm accordingly may then choose 1002A as the global gap size. Each collection then: has its elements spaced evenly with the global gap size 1002A, as seen in FIG. 10B; has its elements middle aligned, as seen in FIG. 10C; has its rows of elements left aligned, as seen in FIG. 10D; and has its rows of elements distributed within the selection box, as seen in FIG. 10E.

Figure 11A:
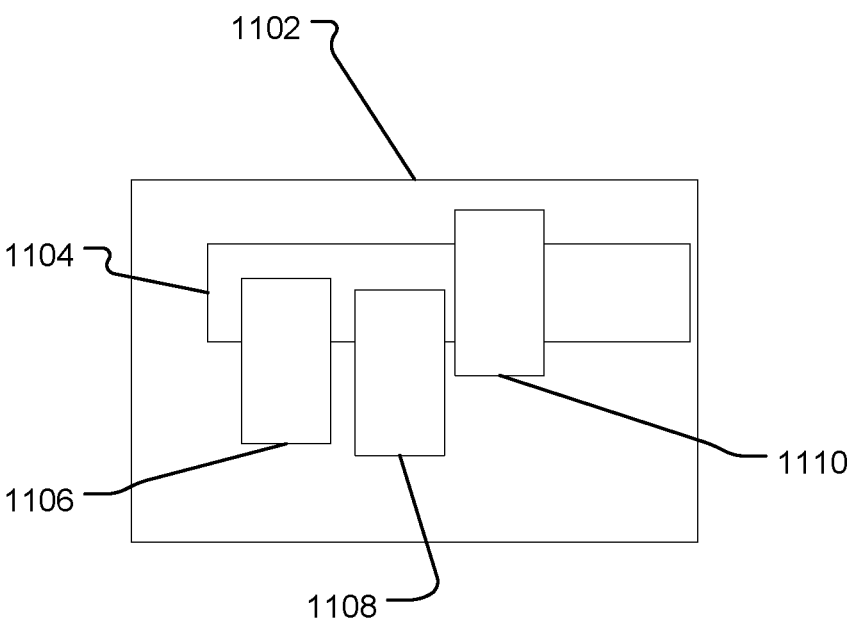
FIGS. 11A-11B show a diagrammatic example of a process for arranging elements in a collection with a spanning element.

FIG. 11A shows a collection of four elements 1104, 1106, 1108 and 1110 and a selection box 1102 (which may for example be the selection box 308 described herein). Element 1104 is an element that will be determined to be a spanning element in step 704 of process 700.

Figure 11B:
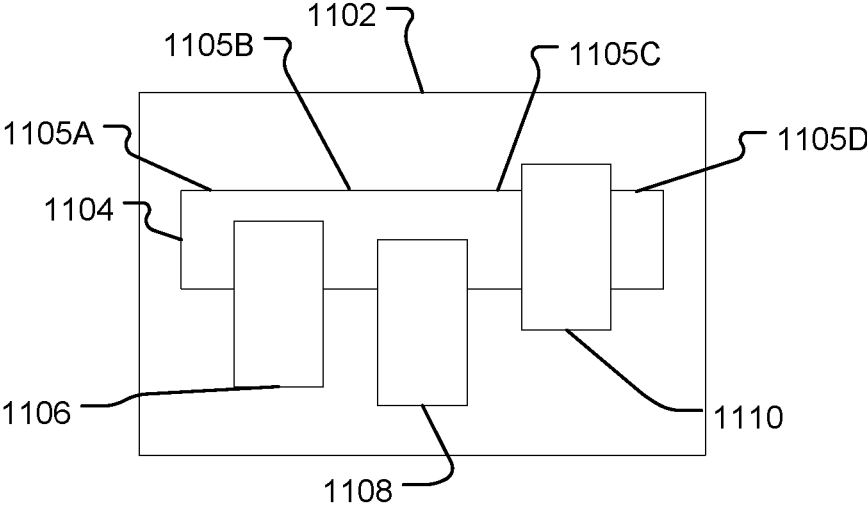
Figure 11C:
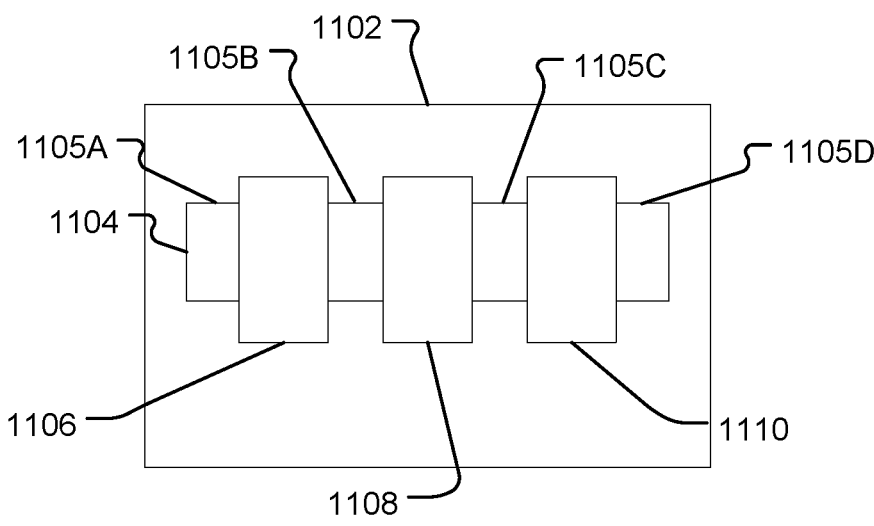
Figure 11D:
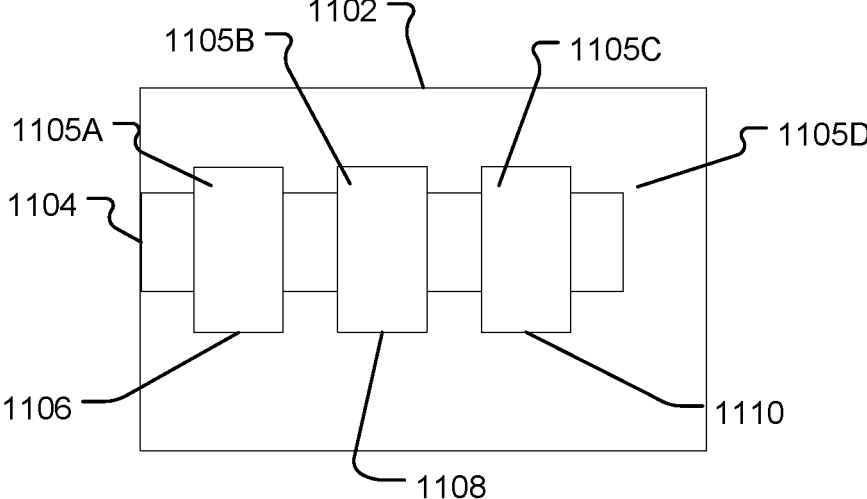

FIG. 11B shows the collection of elements spaced according to a collection gap size 1105A-D. The collection gap size is determined by taking the length of spanning element 1104, subtracting the length of each of the other elements 1106, 1108 and 1110 and dividing by a number of gaps. The number of gaps equals the number of elements in the collection including the spanning element, so in the example of FIG. 11B there are four gaps. The elements are then be spaced according to the collection gap size instead of the global gap size. The collection then has its elements aligned along the arrangement direction, for example middle aligned as seen in FIG. 11C. In some embodiments the elements are then left aligned with the selection box 1102, as seen in FIG. 11D.

The operations of methods 400, 500, 600, 700 may be performed by the application 104 running on the system 102. In alternative embodiments, however, the processing described may be performed by one or more alternative applications running on one or more alternative computer processing systems.

Where application 104 is described as displaying user interfaces (or user interface elements such as controls and other UI objects), application 104 does so via one or more displays—e.g. display 218. Where application 104 operates to receive or detect user input, such input is provided via one or more input devices—e.g. a touch screen, a touch screen display 218, a cursor control device 220, a keyboard 222, and/or an alternative input device.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

Unless otherwise stated, the terms "include" and "comprise" (and variations thereof such as "including", "includes", "comprising", "comprises", "comprised" and the like) are used inclusively and do not exclude further features, components, integers, steps, or elements.

In some instances the present disclosure may use the terms "first," "second," etc. to identify and distinguish between features. When used in this way, these terms are not used in an ordinal sense and are not intended to imply any particular order. For example, a first feature could be termed a second feature or vice versa without departing from the scope of the described examples. Furthermore, when used to differentiate features, a second feature could exist without a first feature or a second feature could occur before a first feature.

Background information described in this specification is background information known to the inventors. Reference to this information as background information is not an acknowledgment or suggestion that this background information is prior art or is common general knowledge to a person of ordinary skill in the art.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for arranging a plurality of elements of a design along an arrangement direction, the method including:

sorting, by a computer processing system, the plurality of elements into a sorted order, wherein the sorting is according to a sort direction perpendicular to the arrangement direction, wherein the sorted order includes a first element of the plurality of elements and a second element of the plurality of elements that immediately follows the first element in the sorted order:

allocating, by the computer processing system, the plurality of elements to a plurality of collections based on the sorting order, wherein a first collection in the plurality of collections includes a plurality of elements, including the first element, that have been determined by the computer processing system to overlap along a dimension perpendicular to the arrangement direction, a second collection in the plurality of collections includes a plurality of elements that have been determined by the computer processing system to overlap along a dimension perpendicular to the arrangement direction, the second element is allocated to the second collection based on a determination by the computer processing system that there is not overlap in the dimension perpendicular to the arrangement direction with all elements allocated to the first collection, and the elements in the first collection are different to the elements in the second collection; and arranging, by the computer processing system, the plurality of elements based on the allocated collections, including one or more of distributing each element in the first collection along the arrangement direction, distributing each element in the second collection along the arrangement direction, aligning elements, and positioning within the design the elements of the first collection as a group and the elements of the second collection as a group.

2. The method of claim 1, wherein allocating the plurality of elements to the first collections includes processes of:

allocating the foremost element in the sorted order to the first collection; and considering one or more subsequent elements of the plurality of elements in the sorted order, determining that a currently considered element overlaps in the dimension perpendicular to the arrangement direction with all the plurality of elements currently in the first collection, and in response allocating the currently considered element to the first collection.

3. The method of claim 2, wherein allocating the plurality of elements to the second collection includes a process of:

considering a further element of the plurality of elements in the sorted order, determining that the further element does not overlap in the dimension perpendicular to the arrangement direction with all the plurality of elements currently in the first collection and in response allocating the further element to the second collection.

4. The method of claim 3, wherein allocating the plurality of elements to the first collection includes a process of determining that each element allocated to the first collection does not overlap in the dimension perpendicular to the arrangement direction more with the further element than with the foremost element in the sorted order.

5. The method of claim 4, wherein allocating the plurality of elements to the second collection includes a process of determining that a said currently considered element initially allocated to the first collection overlaps more in the dimension perpendicular to the arrangement direction with the further element than with the foremost element in the sorted order and in response reallocating that considered element from the first collection to the second collection.

6. The method of claim 5, wherein allocating the plurality of elements to the second collection includes a process of, after the reallocating, considering one or more further subsequent elements of the plurality of elements in the sorted order, determining that a currently considered element overlaps in the dimension perpendicular to the arrangement direction with all the plurality of elements currently in the second collection, and in response allocating the currently considered element to the second collection.

7. The method of claim 1, wherein said arranging includes all of distributing each element in the first collection design along the arrangement direction, distributing each element in the second collection along the arrangement direction, aligning elements, and positioning within the design the elements of the first collection as a group and the elements of the second collection as a group.

8. The method of claim 1 wherein the plurality of elements are each a graphic, image, text, or video.

9. A computer implemented method for determining an arrangement of a plurality of elements of a design into rows or columns, the method including:

allocating, by a computer processing system, the plurality of elements to:

a first plurality of collections, wherein in each of the first plurality of collections the elements at least partially overlap in a vertical dimension; and a second plurality of collections, wherein in each of the second plurality of collections the elements at least partially overlap in a horizontal dimension;

determining, by the computer processing system, an initial arrangement of the first plurality of collections into rows within an area of the design and an initial arrangement of the second plurality of collections into columns within the area of the design;

and either:

determining, by the computer processing system, that the initial arrangement into rows results in less superimposition of the plurality of elements than the initial arrangement into columns and in response determining the arrangement of the plurality of elements as an arrangement into rows, or determining, by the computer processing system, that the initial arrangement into columns results in less superimposition of the plurality of elements than the initial arrangement into rows and in response determining the arrangement of the plurality of elements as an arrangement into columns.

10. The computer implemented method of claim 9, wherein the area of the design is a user specified area.

11. The computer implemented method of claim 10, wherein the plurality of elements were determined by the computer processing system as the elements of the design within the user specified area.

12. The method of claim 9 wherein the plurality of elements are each a graphic, image, text, or video.

13. A computer implemented method for determining an arrangement of elements of a design into rows or columns, the method including:

receiving a user selection of an area within the design, the area including within it a plurality of elements of the design;

allocating, by a computer processing system, the plurality of elements to:

a first plurality of collections, wherein in each of the first plurality of collections the elements at least partially overlap in a vertical dimension; and a second plurality of collections, wherein in each of the second plurality of collections the elements at least partially overlap in a horizontal dimension;

determining, by the computer processing system, an initial arrangement of the first plurality of collections into rows within the area of the design and an initial arrangement of the second plurality of collections into columns within the area of the design; and determining, by the computer processing system, an arrangement of the plurality of elements as either the initial arrangement of the first plurality of collections into rows within the area of the design or the initial arrangement of the second plurality of collections into columns within the area of the design, wherein determining the arrangement of the plurality of elements includes determining that the initial arrangement of the first plurality of collections into rows results in less superimposition of elements than the initial arrangement of the second plurality of collections into columns and in response determining the arrangement of the plurality of elements as an arrangement into rows.

14. The computer implemented method of claim 13, further including before the determining of the arrangement of the plurality of elements:

causing the display on a computer display indicia representing both the initial arrangement of the first plurality of collections into rows and the initial arrangement of the second plurality of collections into columns; and receiving a user selection of the initial arrangement of the first plurality of collections into rows;

wherein the arrangement of the plurality of elements is determined as the initial arrangement of the first plurality of collections into rows responsive to the user selection of the initial arrangement of the first plurality of collections into rows.

15. The method of claim 13 wherein the plurality of elements are each a graphic, image, text, or video.

* * * * *